United States Patent [19]

Neubauer et al.

[11] 4,420,357

[45] Dec. 13, 1983

[54] APPARATUS AND METHOD FOR THE MANUFACTURE OF PARTICLEBOARD

[75] Inventors: Harry Neubauer; Berndt Greten; Günter Seeger, all of Springe, Fed. Rep. of Germany

[73] Assignee: Bison-Werke Bähre & Greten GmbH & Co. KG, Springe, Fed. Rep. of Germany

[21] Appl. No.: 350,552

[22] Filed: Feb. 19, 1982

[30] Foreign Application Priority Data

Feb. 27, 1981 [DE] Fed. Rep. of Germany ....... 3107589

[51] Int. Cl.[3] .............................................. B29C 19/02

[52] U.S. Cl. ................................ 156/274.6; 156/62.2; 156/272.2; 156/274.4; 156/275.5; 156/380.6; 156/312; 156/555; 156/583.5

[58] Field of Search ................. 156/62.2, 274.6, 275.5, 156/380.6, 296, 312, 555, 583.5, 272.2, 274.4

[56] References Cited

U.S. PATENT DOCUMENTS

| | | | |
|---|---|---|---|
| 2,697,254 | 12/1954 | Gordon | 156/274.6 |
| 2,788,838 | 4/1957 | Crabbe et al. | 156/555 |
| 3,256,121 | 6/1966 | Abell | 156/62.2 |
| 4,221,950 | 9/1980 | Lamberts et al. | 156/274.6 |

*Primary Examiner*—Edward C. Kimlin
*Assistant Examiner*—Timothy W. Heitbrink
*Attorney, Agent, or Firm*—Townsend and Townsend

[57] ABSTRACT

A method and an apparatus for the continuous manufacture of particle board from a mat of cellulose based material in the form of particles, fibers or the like, together with at least one heat hardenable binder, features a high frequency heating station 4 disposed between a scattering station 2 and a finishing press 9. The mat 3 scattered in the scattering station 2 is continuously fed on an endless conveyor band 1 through a working gap defined between upper and lower electrode plates 5 and 6 of a high frequency capacitive heating arrangement in the high frequency heating station 4. A recirculating cover band 7 contacts the upper surface of the mat and the mat is moved with full-area contact between the upper and lower electrode plates 5 and 6, i.e. without any form of air gap. Several variants are described, in particular the upper and lower electrode plates 5 and 6 can be constructed to compress the mat to a certain degree. In the FIG. 2 embodiment several sequential pairs of electrode plates 5, 6; 5', 6' are used to heat the mat in stages with compression 10 taking place between sequential pairs of electrodes.

20 Claims, 2 Drawing Figures

APPARATUS AND METHOD FOR THE MANUFACTURE OF PARTICLEBOARD

BACKGROUND OF THE INVENTION

1. Technical Field

The invention relates to a method for the continuous manufacture of particle board and to an apparatus for carrying out this method. The invention has particular reference to a method for the continuous manufacture of chipboard, fiberboard or similar boards from a mat comprising material containing lignocellulose, and/or cellulose, and/or other electrically poorly conducting material in the form of particles, fibers or the like, together with at least one heat hardenable binder dispersed therein, said mat being brought into the board end-form by means of heat introduced at least in part by high frequency energy and pressure.

2. Prior Art

A method of the above named kind is known from German Auslegeschrift No. 27 22 348 (U.S. Pat. No. 4,221,950). In this known method the high frequency heating of the mat takes place between upper and lower plates of a capacitor arranged to introduce high frequency energy into the mat. The arrangement is however such that a small air gap of optimum size is always present between the electrode plates and the mat. This is achieved by regulating the separation of the electrode plates in dependence on the anode current of the electron tube used in the high frequency generator. The regulating circuit that is used features a coarse regulation which is used to vary the electrode plate separation until a predetermined desired value of the anode current is reached. A fine regulation is then superimposed on this coarse regulation to hold the anode current constant. The fine regulation is achieved not by varying the separation of the electrode plates but instead by varying an auxiliary capacitor connected in parallel to the working capacitor formed by the electrode plates. Should the variation in anode current be so great that it cannot be adequately dealt with by variation of the auxiliary capacitor then the coarse regulation once again comes into operation to adjust the separation of the electrode plates.

In order to ensure a flat surface of the mat within the working capacitor or, in the case of a precompressed mat, to prevent the mat expanding, and so as to always ensure a defined air gap, a run of an endless, recirculating, retaining band is tensioned against the surface of the mat passing through the working capacitor. In this manner it is possible to maintain a minimum spacing between the upper electrode plate and the surface of the mat, in particular in the range from 6 to 10 mm, and thereby to achieve good efficiency during high frequency heating. This arrangement has proved successful in practice.

SUMMARY OF THE INVENTION

The principal object underlying the present invention is to develop the initially named method in such a way that mats of different initial materials and different thicknesses can be heated more quickly and more uniformly than previously, with a particularly economical utilisation of the high frequency energy that is supplied, and in such a way as to further reduce the technical control requirements.

This object is satisfied, in accordance with the invention, by a method for the continuous manufacture of chipboard, fiberboard or similar boards from a mat comprising material containing lignocellulose, and/or cellulose and/or other electrically poorly conducting material, in the form of particles, fibers or the like, together with at least one heat hardenable binder dispersed therein, said mat being brought into the board end-form by means of heat, introduced at least in part by high frequency energy, and pressure, wherein the mat is fed with full-area contact on both sides between facing electrode plates of a high frequency heating zone which define a working gap.

The heating of the mat with full-area contact on both sides between the facing electrode plates of the working capacitor while avoiding any form of air gap ensures a particularly high energy density in the working capacitor, and thus a substantial rise in the efficiency and power of the heating process. At the same time the conditions inside the working capacitor, which are always precisely defined, result in very uniform heating of the mat, which is continuously fed through the capacitor, and a considerable simplification of the control requirements.

The working gap in the high frequency heating zone is preferably set to an optimum value for the introduction of high frequency energy and the mat is reduced in thickness before the high frequency heating zone to the thickness of the working gap which corresponds to the ideal capacitance. This optimisation of the working gap, which is achieved while avoiding any air gap, makes it possible to operate at one of the permitted industrial frequencies while avoiding expensive screening measures and also avoids the danger of through and cross arcing between the plates of the capacitor.

A further important and special feature of the invention resides in the fact that a cover band is simultaneously drawn with the mat through the working gap. This cover band, which lies on the surface of the mat and consists of a material which is not heated in the high frequency field, ensures that the structure of the mat is not disturbed, even when the mat is guided in substantially uncompressed condition through the high frequency heating station, and that troublefree full-area contact with the electrode plates is always present.

A variant of the invention is characterised in that the mat is compressed without heating, is then heated in the working gap of the high frequency heating zone, where it is held at at least substantially the precompression thickness, and is then subjected to a prepressing and/or final pressing operation.

If a precompressed mat is guided through the working gap then the electrode plates simultaneously carry out the task of counteracting the tendency of the mat to expand, i.e. the electrode plates have a mat retaining function which is carried out outside of the working gap by the synchronously moving cover band.

All variants of the invention in which heating is carried out by means of high frequency energy prior to a substantial compression of the mat give rise, to a significant extent, to the advantages of a uniform raw density distribution of the mat and also minimisation of the edge losses. The former is a consequence of the fact that the coarse, and in particular elongate parts present in the central layer of the mat become plastic through heating and thus offer little resistance to a subsequent pressing operation, whereas the latter advantage, namely the reduction of the edge losses, arises because the activation of the binder reinforces the adhesion between the individual particles of the mat and thus strongly reduces the blow out effects which customarily occur in the edge regions at the start of pronounced compression or prepressing operations.

A further special feature of the invention lies in an arrangement in which a compression device provided before the high frequency heating zone is controlled in dependence on the size of the working gap in the high frequency heating zone which is necessary for the optimum capacity value.

Also according to the present invention there is provided an apparatus for the continuous manufacture of chipboard, fiberboard or similar boards from a mat comprising material containing lignocellulose and/or cellulose, and/or other electrically poorly conducting material in the form of particles, fibers or the like together with at least one heat hardenable binder dispersed therein, said apparatus comprising at least one high frequency heating device having input and output ends and mutually spaced upper and lower electrode plates defining a working gap, means for conveying the mat through said working gap from said input end to said output end between said mutually spaced electrode plates, a cover band extending through said working gap and intended, in operation, to lie on the upper side of said mat, and wherein the mutual spacing of the electrode plates is substantially equal to or less than the thickness of the mat at said input end so that said mat passes without an air gap through said working gap with said cover band grazingly contacting the upper electrode plate.

In order to reduce the friction between the cover band and the upper electrode plate or capacitor plate the latter is preferably coated with a wear resistant bearing layer, for example "Teflon". A corresponding step can be taken for the lower electrode plate on which the mat conveyor band slides.

If a precompression station precedes the high frequency heating device, in particular to reduce the thickness of the mat to the thickness of the ideal working gap for the high frequency heating device, the cover band serves between the precompressing station and the high frequency heating device as a retaining band which counteracts a tendency of the mat to expand and ensures troublefree introduction of the precompressed mat into the working gap. When working with fiber mats it is particularly advantageous to arrange the high frequency heating station directly adjacent a scattering station which operates with subatmospheric pressure so that the fiber mat passes directly into the working gap in the compressed form resulting from the use of subatmospheric pressure thus avoiding prior expansion of the mat.

A substantial advantage of the method and of the apparatus of the invention resides in the fact that it is possible, while using an industrial frequency which does not require any special shielding measures and with high efficiency of the high frequency heating process, to process mats of a thickness such that the finished board can be manufactured from a single mat and can be brought into the end-form in the finishing press. This advantage, when compared with the previously known methods in which it was necessary to arrange several partial mats one above the other in a finishing press and then to press them to the finished board, results not only in a simplification and an improvement in efficiency but also brings a substantial improvement in quality because the temperature differences which necessarily occur when several mats are arranged one above the other do not occur in the case of a single mat of adequate thickness.

In accordance with a further embodiment of the invention the high frequency heating device has several sequentially arranged pairs of upper and lower electrode plates with an arrangement which generates a line pressure and/or an areal pressure provided between successive plate pairs.

The resulting stepwise heating of the mat, in conjunction with simultaneous compression and the kneading effect which takes place between the electrode plates, brings advantages with regard to the desired uniform density distribution and allows a further optimisation of the utilization of high frequency energy, in particular when the working gaps of successive plate pairs reduce in size as viewed in the transport direction of the mat. In this case it is indeed necessary to use different high frequency generators, however, this additional complexity can be more than compensated for by the reduction of the time required to manufacture the boards and by the improvement in quality.

The invention will now be described in more detail by way of example only and with reference to the accompanying drawings:

DETAILED DESCRIPTION OF THE PREFERRED EMBODIMENT

Figure 1:
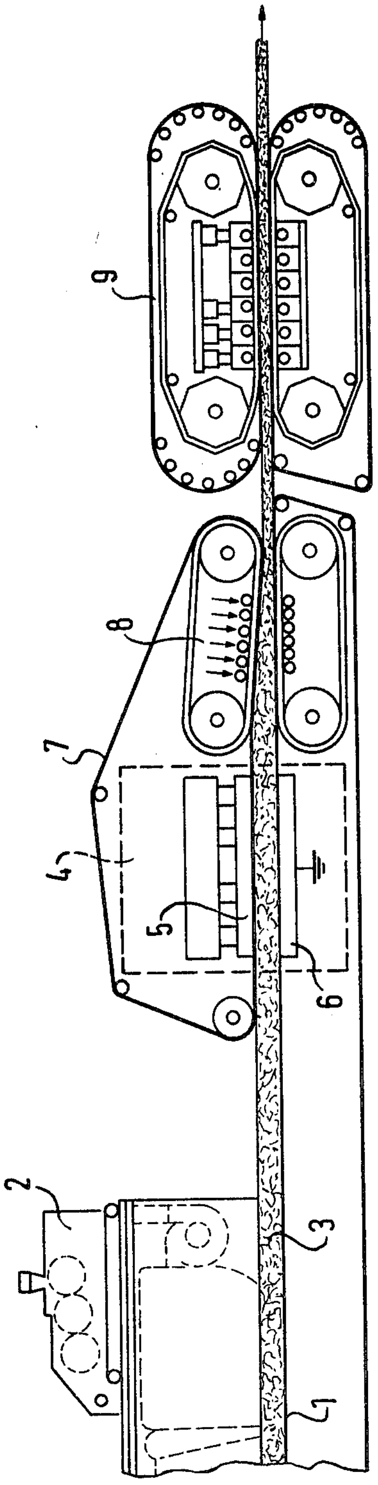
FIG. 1 is a schematic illustration of a plant operating in accordance with the method of the invention for the continuous manufacture of boards.

As seen in FIG. 1 a forming station 2 for forming a mat 3 is arranged above a continuously moving endless transport conveyor band 1. The forming station 2 is only partially illustrated and is, in each case, constructed in dependence on the material that is to be scattered.

The uncompressed mat 3, which contains at least one heat hardenable binder and the thickness of which is in each case selected to correspond to the required board thickness, is fed through a high frequency heating station 4. This station 4 includes a high frequency heating device which, in the illustrated embodiment, comprises mutually spaced upper and lower electrode plates 5 and 6 which define a working gap.

It is of essential significance that the mat 3 is guided with full-area contact through the working gap, i.e. no form of air gap is allowed to exist between the mat 3 and either of the electrodes.

As the conveyor band 1 is guided with grazing contact over the lower electrode plate 6 no air gap can exist between the lower electrode plate 6 and the mat. Measures are also taken to ensure that no air gap exists between the upper side of the mat and the upper electrode plate 5. This is preferably achieved by using a cover band 7 which runs synchronously with the conveyor band 1 and covers the whole surface of the mat as it passses through the working gap, with the cover band also being guided with grazing contact on the upper electrode plate 5 through the working gap. The cover band consists of a wear resistant material which is not heated in the high frequency field and the pair of electrode plates 5 and 6 are usefully coated with a lining having a low coefficient of friction for example "Teflon". Under these circumstances it is possible to draw the mat enclosed between the conveyor band 1 and the cover band 7 through the working gap of the capacitor, even when the upper capacitor plate 5 simultaneously exerts a certain degree of compression or retaining pressure on the mat, or has to exert such pressure in order to ensure optimum capacity as is required to guarantee optimum mat heating while simultaneously avoiding through or cross arcing dangers at the industrial frequency of 27.12 mHz and a suitable working voltage.

The mat is preferably heated to 40° to 80° C. in the high frequency heating station 4 and then passes, in the illustrated embodiment, into a prepressing station 8 which is followed by a heated finishing press 9. Advantageous embodiments also use, in conjunction with fiber mats, a prepressing device arranged in front of the high frequency heating station 4, with the press pressure of the prepressing device preferably being selected to be higher than that of the press 8 arranged directly after the high frequency heating station.

An installation of particularly short length and/or having a higher operating speed can be achieved if the high frequency heating station is simultaneously constructed as a press station, i.e. if the electrode plates are arranged to compress the mat.

In order to further reduce friction within the high frequency heating station recirculating belts can be associated with each of the upper and lower electrode plates 5 and 6 so that the loads on the conveyor band 1 and the cover band 7 are minimised.

Figure 2:
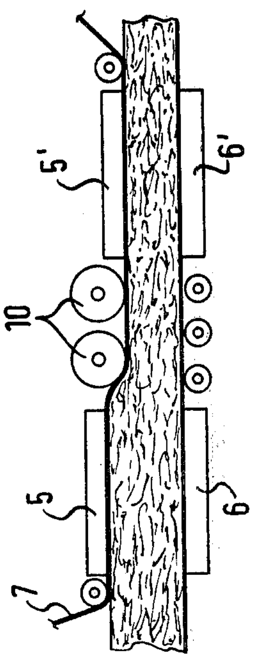
FIG. 2 is a schematic part illustration of a variant of the plant of FIG. 1.

In the variant FIG. 2 the high frequency heating station comprises a first pair of upper and lower electrode plates 5, 6 and a second pair of upper and lower electrode plates 5', 6' which have a smaller working gap, there being a high frequency generator associated with each of these electrode plate pairs.

Between the two plate pairs 5, 6 and 5', 6' there is provided an apparatus 10 for compressing the mat. This apparatus 10 acts to compress the mat, which has been heated in the substantially uncompressed condition in the first working gap between the capacitor plates 5, 6, to a reduced thickness by exerting line and/or areal pressure thereon. This is followed by further high frequency heating which is carried out by means of the capacitor plates 5', 6'. The mat is subsequently passed to a prepressing and/or final pressing station.

In accordance with the method of the invention, and also when using the associated apparatus, it is possible to compress fiber mats with a thickness of for example 600 mm in a continuous cycle and thus to manufacture thick board in one working process. For thick board of this kind it was previously necessary to form several partial mats, to arrange these mats one on top of the other in a finishing press and to press them together to produce the final board.

It is of particular significance that it is possible to operate with the industrial frequency of 27.12 mHz and powers of 100 KW and more without having to worry about cross and through-arcing, in particular with relatively high mats, as is the case when operating with an air gap as a result of the high working voltages. In addition, the anode current can be regulated to a constant value without difficulties, a high degree of heating is achieved and the uniformity of heating is improved so that a high board quality is ensured.

I claim:

1. Apparatus for the continuous manufacture of boards from a mat of electrically poorly conducting material in the form of particles, fibers or the like, together with at least one heat hardenable binder dispersed therein, said apparatus comprising: at least one high frequency heating device having input and output ends and mutually spaced upper and lower stationary electrode plates defining a working gap; means for adjusting said upper electrode plate in a vertical direction to adjust said working gap and thus the capacitance of said high frequency heating device; an endless conveyor band for transporting the mat through said working gap from said input end to said output end between said mutually spaced electrode plates; a retaining band extending through said working gap and intended, in operation, to lie on the upper side of said conveyor band and retain said material in position on said mat; wherein the mutual spacing of the electrode plates is substantially equal to or less than the thickness of the mat at said input end, so that said mat passes without an air gap through said working gap with said retaining band grazingly contacting said upper electrode plate, and with said conveyor band grazingly contacting said lower electrode plate, and wherein said electrode plates are adapted to facilitate relative sliding movement of said conveyor band and said retaining band thereover.

2. Apparatus in accordance with claim 1 further comprising a fiber scattering station which operates with subatmospheric pressure and wherein the high frequency heating device is arranged directly adjacent said station.

3. Apparatus in accordance with claim 1 wherein a precompression station is provided before the high frequency heating device and wherein the retaining band acts, between said station and the high frequency heating device, to hold the mat in place.

4. Apparatus in accordance with claim 1 and wherein the high frequency heating device has several sequentially arranged pairs of upper and lower electrode plates with a pressure roller arrangement being respectively provided between successive plate pairs.

5. Apparatus in accordance with claim 1 and wherein the high frequency heating device has several sequentially arranged pairs of upper and lower electrode plates, with a least one continually operating press which exerts an areal pressure being respectively arranged between successive plate pairs.

6. Apparatus in accordance with claim 1 and wherein the high frequency heating device has several sequentially arranged pairs of upper and lower electrode plates with a continuously operating press arrangement which exerts line pressure and areal pressure respectively between successive plate pairs.

7. Apparatus in accordance with claim 4 and wherein the gap width of the sequentially arranged plate pairs reduces in the transport direction of the mat.

8. Apparatus in accordance with claim 5 and wherein the gap width of the sequentially arranged plate pairs reduces in the transport direction of the mat.

9. Apparatus in accordance with claim 6 and wherein the gap width of the sequentially arranged plate pairs reduces in the transport direction of the mat.

10. Apparatus in accordance with claim 1 and wherein a freely usable industrial frequency is selected as the working frequency of the high frequency heating device.

11. Apparatus in accordance with claim 10 and wherein the working frequency of the high frequency heating device amounts to 27.12 mHz±0.6%.

12. Apparatus in accordance with claim 10 and wherein the working frequency on the high frequency heating device amounts to 13.56 mHz±0.06%.

13. Apparatus in accordance with claim 9 wherein a forming station is provided for forming said mat and wherein a continuously operating prepress apparatus is arranged between the forming station and the high frequency heating device.

14. Apparatus in accordance with claim 13 further comprising a continuous press following the high frequency heating device and wherein the pressure exerted in the prepress apparatus arranged in front of the high frequency heating device is higher than the pressure exerted in the continuous press.

15. Apparatus in accordance with claim 1 and wherein a prepress is arranged in front of the high frequency heating device and the high frequency heating device is integrated in a finishing press.

16. Apparatus in accordance with claim 1 and wherein the upper and lower electrode plates of the high frequency heating device simultaneously form press pressure plates.

17. Apparatus in accordance with claim 4 and wherein the pressure roller arrangement consists of several pressure rollers which are surrounded by a band.

18. Apparatus in accordance with claim 9 wherein a prepress is inserted before the high frequency heating device and a further press is arranged after the high frequency heating device; and wherein said retaining band is a recirculating band the lower run of which is guided through the prepress, the high frequency heating device and the further press.

19. Apparatus in accordance with claim 1 and wherein an additional recirculating band is guided around at least the upper electrode plate of the high frequency heating device.

20. Apparatus for the continuous manufacture of particleboard from a compressible mat of electrically poorly conducting cellulose based material with a heat hardenable binder dispersed therein, said apparatus comprising:

a high frequency heating device having upper and lower parallel and stationary and adjustable electrode plates spaced apart to define therebetween a working gap having an input end and an output end;

means for adjusting said upper electrode in a vertical direction, whereby said working gap can be varied to adjust the working capacitance of said heating device to an ideal value;

an endless coveyor band for supporting said mat, said endless transport band being arranged for continuous movement through said working gap in a direction from said input end to said output end in full area grazing contact with said lower electrode plate; and an endless retaining band positioned above and in contact with said mat, said retaining band being arranged for simultaneous movement with said mat through said working gap from said input end to said output end and being in full area grazing contact with said upper electrode plate and wherein said electrode plates are adapted to facilitate relative sliding movement of said conveyor band and said retaining band thereover.

* * * * *